(12) United States Patent
Matsuda

(10) Patent No.: US 9,393,843 B2
(45) Date of Patent: Jul. 19, 2016

(54) PNEUMATIC TIRE HAVING PROTRUSION FORMED ON SIDEWALL

(75) Inventor: Yosuke Matsuda, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 1180 days.

(21) Appl. No.: 13/406,148

(22) Filed: Feb. 27, 2012

(65) Prior Publication Data

US 2012/0216930 A1 Aug. 30, 2012

(30) Foreign Application Priority Data

Feb. 28, 2011 (JP) ................................. 2011-042858

(51) Int. Cl.
| | | |
|---|---|---|
| *B60C 11/01* | (2006.01) | |
| *B60C 13/02* | (2006.01) | |
| *B60C 11/11* | (2006.01) | |
| B60C 11/03 | (2006.01) | |

(52) U.S. Cl.
CPC ................. *B60C 13/02* (2013.01); *B60C 11/11* (2013.01); *B60C 11/01* (2013.01); *B60C 11/0318* (2013.04)

(58) Field of Classification Search
CPC ........ B60C 11/11; B60C 13/02; B60C 11/01; B60C 11/0318
See application file for complete search history.

(56) References Cited

U.S. PATENT DOCUMENTS

| | | | | | |
|---|---|---|---|---|---|
| 3,482,616 | A | * | 12/1969 | French ..................... | B60C 11/01 152/209.16 |
| D629,352 | S | * | 12/2010 | Takano ........................ | D12/605 |
| D629,353 | S | * | 12/2010 | Takano ........................ | D12/605 |
| D631,823 | S | * | 2/2011 | Takano ........................ | D12/605 |
| D634,702 | S | * | 3/2011 | Takano ........................ | D12/605 |
| D634,703 | S | * | 3/2011 | Takano ........................ | D12/605 |
| 2003/0140997 | A1 | * | 7/2003 | Suzuki ................ | B60C 11/0318 152/209.3 |
| 2012/0073719 | A1 | * | 3/2012 | Kurosawa ............... | B60C 13/02 152/523 |

FOREIGN PATENT DOCUMENTS

| | | | |
|---|---|---|---|
| JP | 2892115 B2 | * | 5/1999 |
| JP | 2003-112505 A | | 4/2003 |
| JP | 2004-291938 A | * | 10/2004 |

OTHER PUBLICATIONS

Machine translation for Japan 2004-291938 (no date).*
Machine translation for Japan 2,892,115 (no date).*

* cited by examiner

*Primary Examiner* — Steven D Maki
(74) *Attorney, Agent, or Firm* — Birch, Stewart, Kolasch & Birch, LLP

(57) ABSTRACT

A pneumatic tire includes a tread portion, a pair of sidewall portions, a pair of bead portions, and a protrusion. The protrusion includes a plurality of longitudinal ribs and a low height part. Each rib has a protruding height of 0.5 to 7.0 mm from the normal outer surface of the sidewall. Each low height part has a protruding height from the normal outer surface of the sidewall that is lower than that of the longitudinal ribs. The sidewall portion with the protrusion has a ratio between a total area of the protrusion projected onto the normal outer surface of the sidewall portion and an area between an outer circumferential line on the sidewall portion passing through a radially outmost point of the protrusion and an inner circumferential line on the sidewall portion passing through a radially innermost point of the protrusion in a range of from 50 to 80%.

8 Claims, 8 Drawing Sheets

PNEUMATIC TIRE HAVING PROTRUSION FORMED ON SIDEWALL

BACKGROUND OF THE INVENTION

1. Field of the Invention

The present invention relates to a pneumatic tire that suppresses increase in tire mass while maintaining cut resistance and steering stability.

2. Description of the Background Art

Pneumatic tires used in vehicles for running on roads in bad conditions such as four-wheel-drive cars and trucks, may be cut at a sidewall portion due to collision with a sharp stone or the like during running on a bad road. In addition, there is a problem that the sidewall portions of the pneumatic tires are likely to be bent under heavy load acting on the tires, thereby bringing about deterioration of steering stability.

Conventionally, to cope with such problems, as shown in FIG. 8, it has been suggested a tire in which protrusions c protruding axially outwardly are provided on the outer surface of a sidewall portion "a" (refer to Japanese Patent Application Publication No. 2003-112505, for example). The protrusions c can increase cut resistance and rigidity of the sidewall portion, which leads to enhancement of steering stability.

SUMMARY OF THE INVENTION

However, the protrusions c are provided continuously in a circumferential direction of the tire, and thus become large in rubber volume, which results in increase of tire mass.

The present invention is revised in light of the foregoing circumferences, and a main object of the present invention is to provide a pneumatic tire including a protrusion formed by a rib and a low height part, and configured to suppress increase in tire mass while maintaining cut resistance and steering stability, basically by limiting a maximum height of the rib from a sidewall surface and a ratio (A1/A2) between a total area A1 of the protrusion and an area A2 of a region between an outer circumferential line of the protrusion and an inner circumferential line of the protrusion, and the like, to predetermined ranges.

According to the present invention, a pneumatic tire comprises a tread portion, a pair of sidewall portions each extending radially inwardly from the both edge of the tread portion, a pair of bead portions each being formed on radially inner portion of the sidewall portion, a protrusion being formed on at least one sidewall portion and protruding from a normal outer surface of the sidewall portion, wherein the protrusion comprises a plurality of longitudinal ribs each extending at angle of from 0 to 20 degrees with respect to a radial direction of the tire and a low height part disposed between the longitudinal ribs, each longitudinal rib has a protruding height of 0.5 to 7.0 mm from the normal outer surface of the sidewall portion, each low height part has a protruding height from the normal outer surface of the sidewall which is lower than that of the longitudinal ribs, and the sidewall portion with the protrusion has a ratio A1/A2 between a total area A1 of the protrusion projected onto the normal outer surface of the sidewall portion and an area A2 between an outer circumferential line on the sidewall portion passing through a radially outmost point of the protrusion and an inner circumferential line on the sidewall portion passing through a radially innermost point of the protrusion is in a range of from 50 to 80%.

The foregoing ribs each have a maximum height limited to the foregoing range, which makes it possible to suppress increase in tire mass while maintaining cut resistance. In addition, the ratio (A1/A2) is limited to the foregoing range, which makes it possible to reduce rubber volume as compared to a pneumatic tire with conventional circumferentially continuous protrusions while maintaining cut resistance and steering stability, thereby effectively suppressing increase in tire mass.

In the description herein, unless otherwise stated, dimensions of parts of the tire have values specified in an unloaded normal state where the tire is mounted on a standard wheel rim and is inflated with a standard pressure.

The standard wheel rim is a wheel rim officially approved for the tire by standard organization, i.e. JATMA (Japan and Asia), T&RA (North America), ETRTO (Europe), STRO (Scandinavia) and the like. For example, the standard rim is the "standard rim" specified in JATMA, the "Measuring Rim" in ETRTO, the "Design Rim" in TRA or the like.

The standard pressure is an air pressure for tire specified by the standard organization above. For example, the standard pressure is the "maximum air pressure" in JATMA, the "Inflation Pressure" in ETRTO, the maximum pressure given in the "Tire Load Limits at Various Cold Inflation Pressures" table in TRA or the like.

DESCRIPTION OF THE PREFERRED EMBODIMENTS

Figure 1:
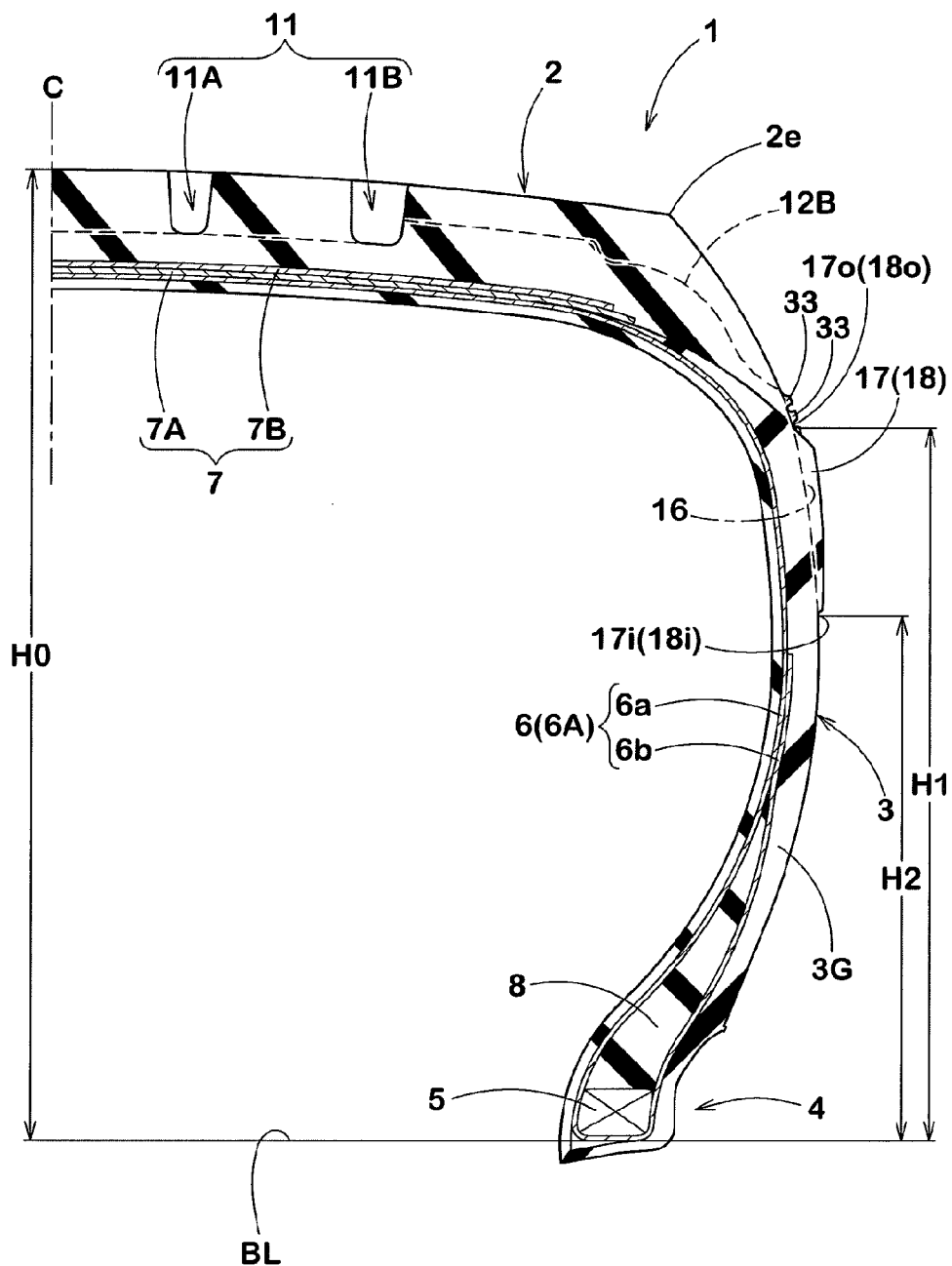
FIG. 1 is a cross sectional view of a pneumatic tire of a present embodiment.

An embodiment of the present invention will next be described with reference to the figures. As shown in FIG. 1, a pneumatic tire (hereinafter referred simply as tire) 1 of the present embodiment comprises a tread portion 2, a pair of sidewall portions 3 each extending radially inwardly from the both edge of the tread portion 2, a pair of bead portions 4 each being formed on radially inner portion of the sidewall portion 3. In this embodiment, the tire 1 is disclosed as a SUV (Sports Utility Vehicles) tire or a light truck tire.

Figure 2:
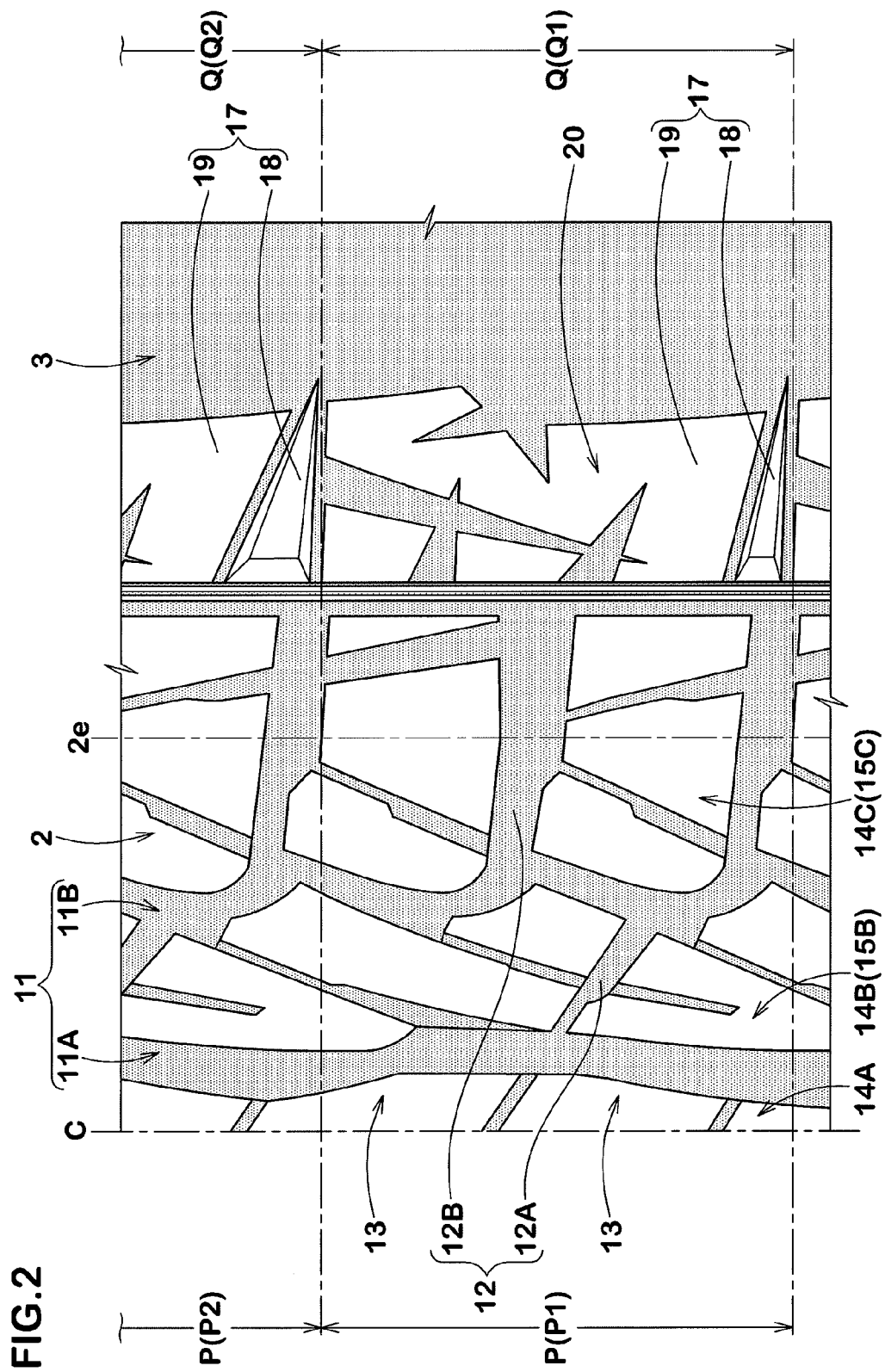
FIG. 2 is a development view of a tread portion and a sidewall portion.

As shown in FIG. 2, the tread portion 2 has a plurality of longitudinal grooves 11 extending circumferentially and lateral grooves 12 extending in a direction of intersecting with the longitudinal grooves 11. In addition, the tread portion 2 has a tread pattern formed by arranging tread design units 13 repeatedly in a circumferential direction of the tire over the entire tread width. There are a plurality of kinds of tread design units 13 with different pattern pitches P (P1, P2, ... ) as circumferential lengths, and the pitch variations are useful for suppressing pitch noise during running.

The longitudinal grooves 11 are configured to include a pair of center longitudinal grooves 11A extending circumferentially in a zigzag manner at the both sides of a tire equator C, and a pair of shoulder longitudinal grooves 11B extending between the center longitudinal grooves 11A and a tread edge 2e in a zigzag manner with a smaller pitch than that of the center longitudinal grooves 11A. Accordingly, the tread portion 2 is divided into a center land portion 14A extending circumferentially between the pair of center longitudinal grooves 11A; middle land portions 14B extending circumferentially between the center longitudinal grooves 11A and the shoulder longitudinal grooves 11B; and a shoulder land portions 14C extending circumferentially between the shoulder longitudinal grooves 11B and the tread edges 2e.

In addition, the lateral grooves 12 are configured to include middle lateral grooves 12A passing between the center longitudinal groove 11A and the shoulder longitudinal groove 11B to divide the middle land portion 14B into a plurality of middle blocks 15B, and shoulder lug grooves 12B extending from the axial inside of the tire than the tread end 2e (the shoulder longitudinal grooves 11B in the present embodiment) and terminating beyond the tread edge 2e and dividing the shoulder land portion 14C into a plurality of shoulder blocks 15C. The lateral grooves 12 are capable of guiding a water film intervening between the tread surface of the tread portion 2 and a road surface in a tire axial direction and digging up a large amount of sand and soil on a sandy road, which is useful for obtaining traction performance.

As shown in FIG. 1, the tire 1 comprises a carcass 6 extending from the tread portion 2 through the sidewall portions 3 to the bead core 5 of each bead portion 4, and a belt 7 disposed on the radially outside the carcass 6 in the tread portion 2.

The carcass 6 comprises at least one ply 6A of carcass cords arranged radially at an angle in the range of from 80 to 90 degrees with respect to the tire equator C. In this embodiment, the carcass 6 is composed of a single ply 6A. As for the carcass cord, organic fiber cords, e.g. aromatic polyamide, nylon, polyester, rayon and the like, or steel cords can be used.

The carcass ply 6A extends between the bead portions 4 through the tread portion 2 and sidewall portions 3 and turned up around the bead core 5 in each bead portion 4 from the axially inside to the axially outside of the tire to form a pair of turnup portions 6b and a main portion 6a therebetween. In order to reinforce the bead portion 4, a tapered bead apex 8 is disposed between the main portion 6a and the turnup portion 6b of the carcass ply 6A.

The belt 7 comprises two belt plies 7A, 7B of belt cords laid at an angle of from 10 to 35 degrees with respect to the tire equator C. The belt plies 7A, 7B are laid so that the belt cords of each ply 7A, 7B are crossed each other. As for the belt cord, steel cords, or high modulus organic fiber cords, e.g. aromatic polyamide, rayon and the like can be used.

In the tire 1 of the present embodiment, at least one of the sidewall portions 3, both in the embodiment, has protrusions 17 protruding from a normal outer surface 16 of the sidewall portion 3. In the present embodiment, the protrusions 17 are formed by the same rubber as a sidewall rubber 3G. The protrusions 17 increase rubber volume of the sidewall portions 3 and enhance the rigidity of the same, thereby improving cut resistance and steering stability.

The normal outer surface 16 of the sidewall here refers to a surface extending almost in parallel to the carcass 6 in a meridian cross section including a tire axis in the normal state, that is, a profile of the outer surface of the sidewall portions 3 except for the protrusions 17.

Figure 3:
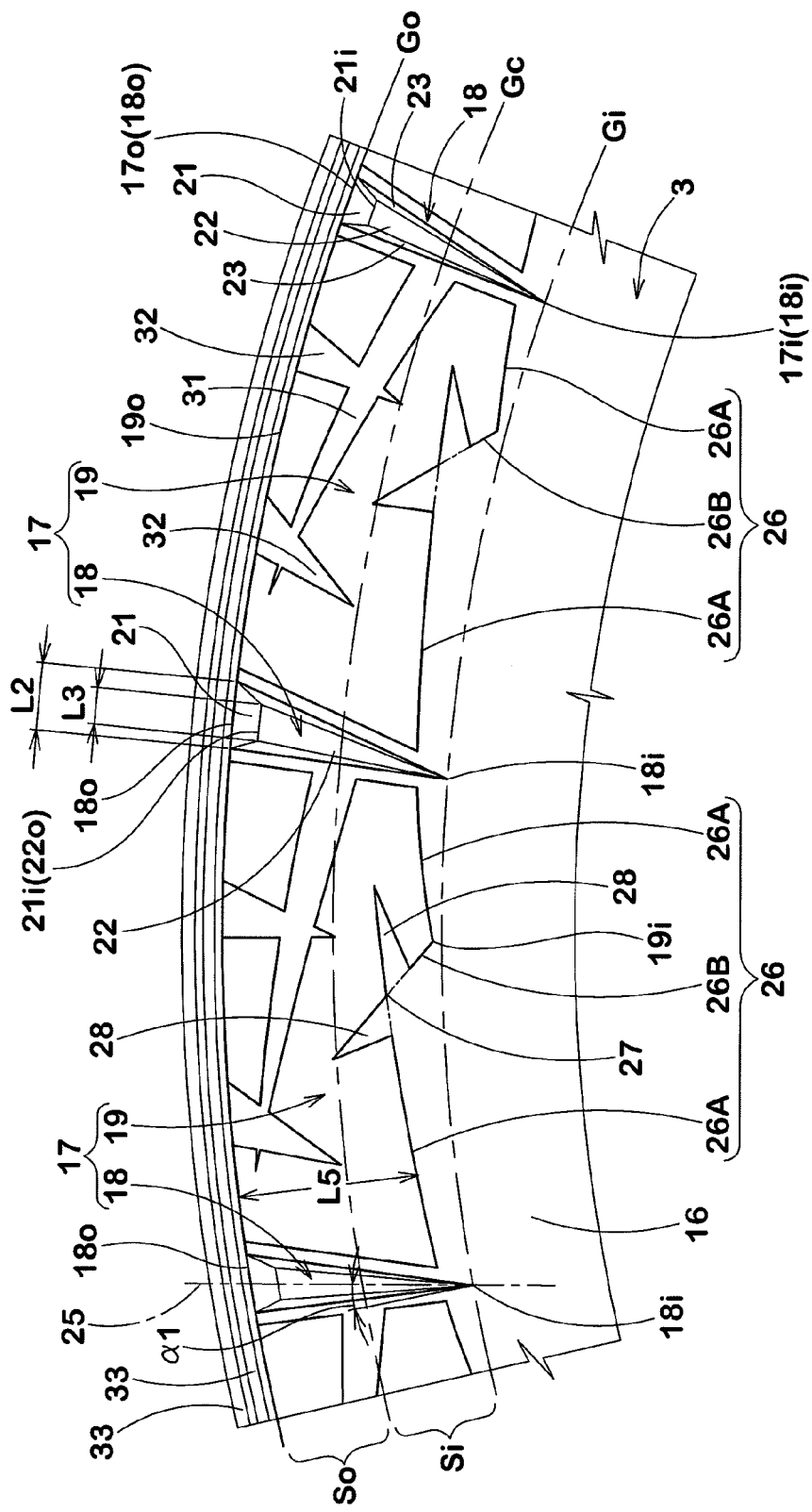
FIG. 3 is an enlarged side view of the sidewall portion.

As shown in FIG. 3, in the present embodiment, the sidewall portions 3 with the protrusions 17 each have a ratio (A1/A2) between a total area A1 of the protrusion projected onto the normal outer surface 16 of the sidewall and an area A2 between an outer circumferential line Go passing through a radially outmost point 17o of the protrusion 17 and an inner circumferential line Gi passing through a radially innermost point 17i of the protrusion 17, which is set to 50 to 80%.

Figure 8:
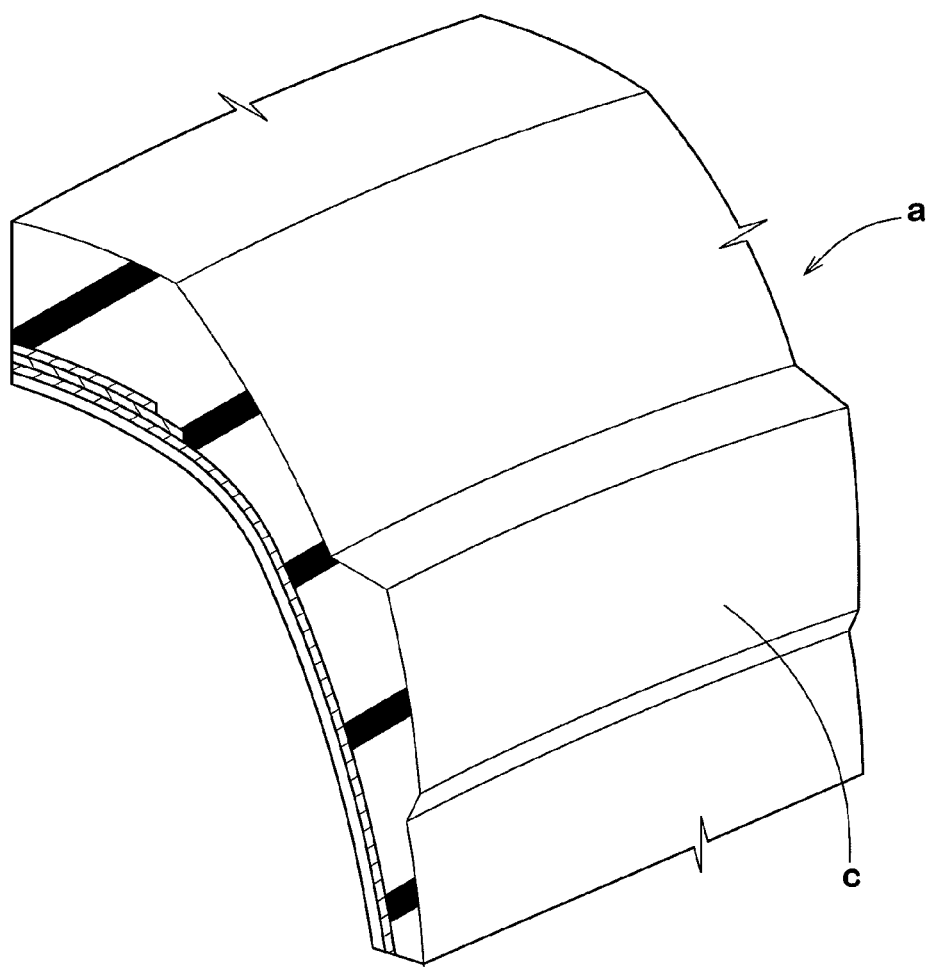
FIG. 8 is a perspective view of a pneumatic tire having a conventional protrusion.

Accordingly, the protrusions 17 are capable of reducing rubber volume as compared to a tire with conventional circumferentially continuous protrusions as shown in FIG. 8. Therefore, the tire 1 of the present embodiment makes it possible to effectively suppress increase in tire mass while maintaining cut resistance and steering stability.

If the foregoing ratio (A1/A2) is less than 50%, it is not possible to sufficiently enhance the rigidity of the sidewall portions 3. In contrast, if the ratio (A1/A2) exceeds 80%, it is not possible to sufficiently suppress increase in tire mass. From this point of view, the ratio (A1/A2) is preferably 50% or more, further preferably 60% or more, and preferably 80% or less, further preferably 70% or less.

In addition, the sidewall portions 3 with the protrusions 17 each have a ratio (A1o/A2o) between an area A2o of an outer sidewall region So between the outer circumferential line Go and a middle circumferential line Gc passing the center point between the outer circumferential line Go and the inner circumferential line Gi and a total area A1o of the protrusions 17 included in the outer sidewall region So, which is preferably larger than a ratio (A1i/A2i) between an area A2i of an inner sidewall region Si between the inner circumferential line Gi and the middle circumferential line Gc and a total area A1i of the protrusions 17 included in the inner sidewall region Si.

Accordingly, the tire 1 can be relatively increased in rubber volume on the radially outer side prone to be cut, which makes it possible to effectively suppress increase in tire mass while enhancing cut resistance.

If the foregoing ratio (A1o/A2o) becomes excessively small, there is a possibility that the foregoing operation cannot sufficiently be provided. In constant, if the ratio (A1o/A2o) becomes excessively large, there arises a too large difference in rigidity between the outer sidewall region So and the inner sidewall region Si, which may result in deterioration of steering stability and crack resistance. From this point of view, the ratio (A1o/A2o) is preferably 101% or more of the ratio (A1i/A2i), further preferably 120% or more, and preferably 140% or less, further preferably 135% or less.

As shown in FIGS. 2 and 3, the protrusions 17 are configured to include a plurality of longitudinal ribs 18 radially extending and circumferentially spaced, and low height parts 19 disposed between the ribs 18 and 18 circumferentially adjacent to each other.

Figure 4:
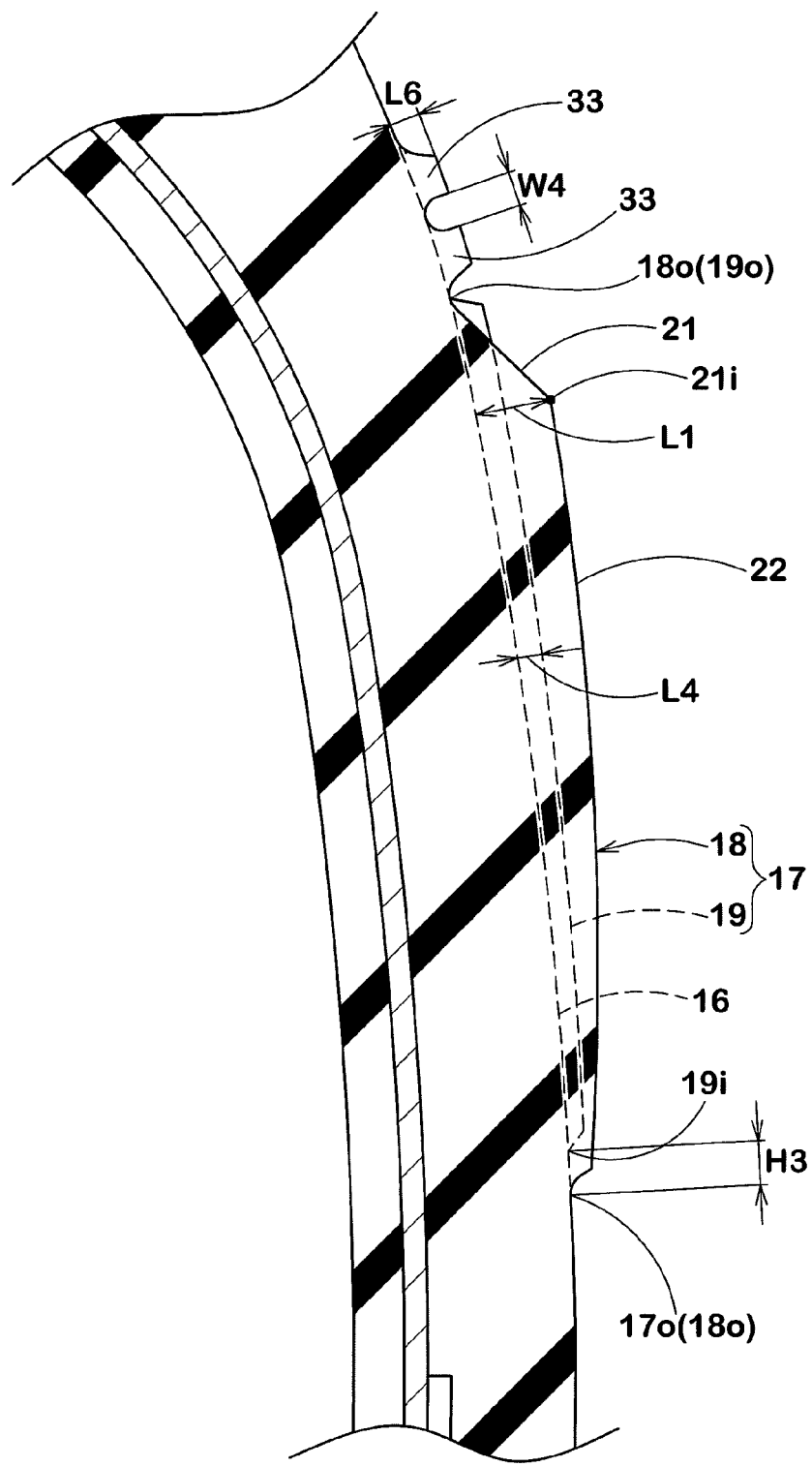
FIG. 4 is a partially enlarged view of FIG. 1.
Figure 5:
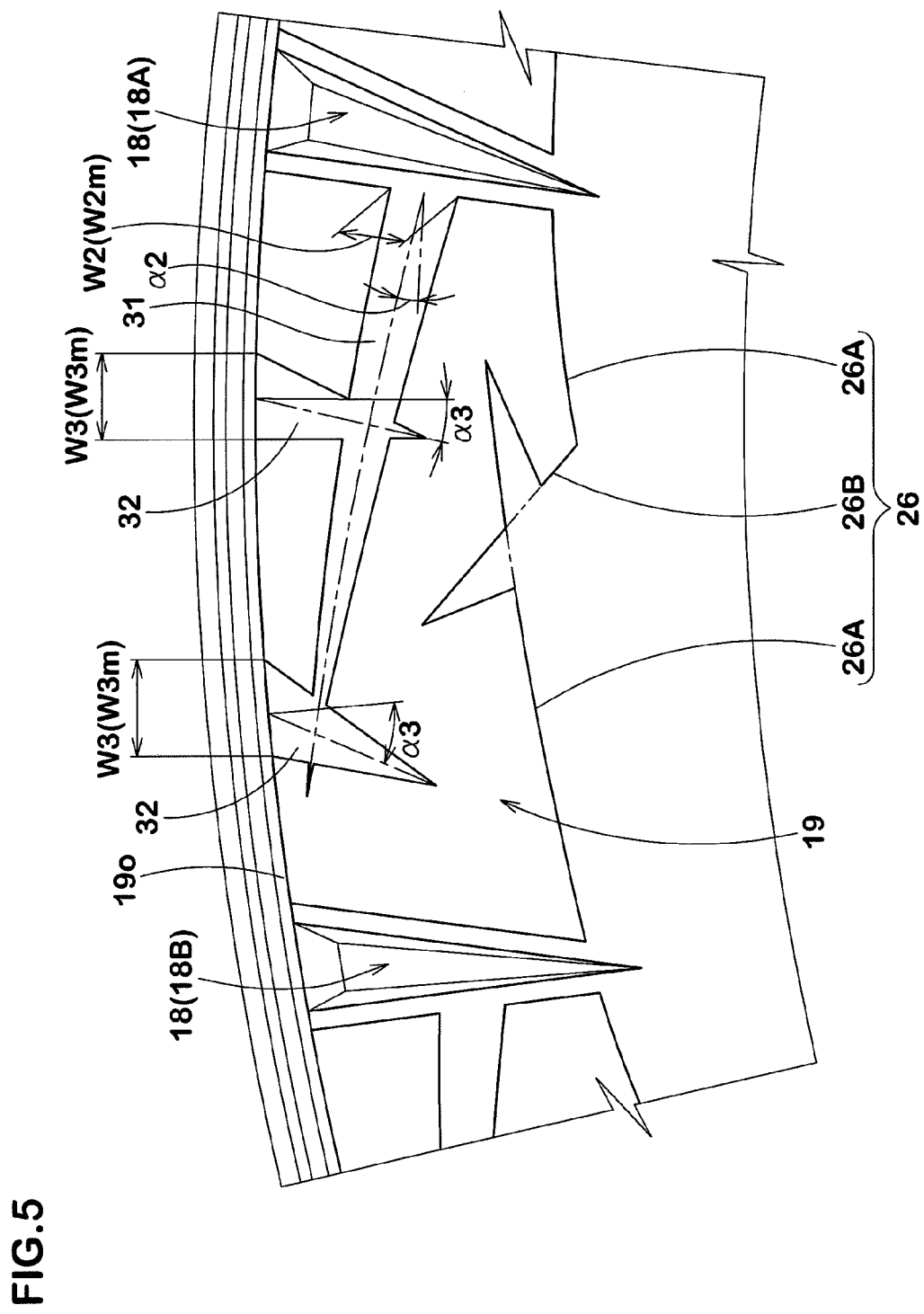
FIG. 5 is a partially enlarged view of FIG. 3.

As shown in FIGS. 3 and 4, the ribs 18 are each formed so as to include an outer wall surface 21 extending from a radially outmost point 18o to the radial inside of the tire, an inner wall surface 22 extending from a radially inner end 21i of the outer wall surface 21 to the radial inside of the tire, and a pair of lateral side surfaces 23 and 23 extending from both edges of the wall surfaces on both circumferential sides to the axial inside of the tire.

The inner end 21i of the outer wall surface 21 has a largest height L1 from the normal outer surface 16 of the sidewall portion 3 of the ribs 18, which is set to 0.5 to 7.0 mm. In addition, the ribs 18 are each formed in a sharpened shape such that a circumferential width L2 of the outer wall surface 21 and a circumferential width L3 of the inner wall surface 22 become gradually smaller with increasing proximity to the radial inside of the tire, and a radially innermost point 18i is tapered.

In addition, the ribs 18 each extend with inclination at an angle α1 of from 0 to 20 degrees with respect to a radial direction of the tire. The angle α1 is measured by a central line 25 linking the circumferential center of the outmost point 18o and the innermost point 18i.

The ribs 18 each provide high rigidity against external forces in the radial direction of the tire (direction along a road surface) and in the axial direction of the tire. This makes it possible to prevent the tire 1 from being cut due to collision between the sidewall portion 3 and a sharp stone or the like, or the sidewall portion 3 being twisted under heavy load on the tire 1, thereby improving cut resistance and steering stability. In addition, the ribs 18 each have the maximum height L1 limited to the foregoing range, which makes it possible to effectively reduce rubber volume and suppress increase in tire mass.

In addition, the ribs 18 of the present embodiment are each more sharpened with increasing proximity to the radial inside of the tire, which makes it possible to effectively suppress increase in tire mass while maintaining cut resistance.

Further, the ribs 18 are each configured such that the outmost point 18o of the rib 18 is aligned to the radially outmost point 17o of the protrusion 17, and the radially innermost point 18i of the rib 18 is aligned to the radially innermost point 17i of the protrusion 17. Accordingly, the ribs 18 are disposed in a wide area of the sidewall portions 3, thereby effectively improving cut resistance and steering stability.

If the angle $\alpha 1$ exceeds 20 degrees, it is not possible to sufficiently enhance rigidity against an external force in the radial direction of the tire, which deteriorates cut resistance and crack resistance. From this point of view, the angle $\alpha 1$ is preferably set zero degree, more preferably not less than two degrees, further preferably not less than four degrees, and preferably not more than 20 degrees, further preferably not more than 15 degrees.

If the largest height L1 is 0.5 mm or less, it is not possible to sufficiently increase rubber volume of the ribs 18 or enhance cut resistance and steering stability. In contrast, if the largest height L1 exceeds 7.0 mm, the ribs 18 become excessively large in rubber volume, which leads to increase in tire mass. From this point of view, the largest height L1 is preferably 0.5 mm or more, further preferably 1.0 mm or more, and preferably 7.0 mm or less, further preferably 6.0 mm or less.

From the same point of view, the width L2 of the outer wall surface 21 at the outmost point 18o is preferably set not less than 16.0% of a pattern pitch Q (shown in FIG. 2) as a circumferential length of a protrusion design unit 20 including one rib 18 and one low height part 19, further preferably not less than 17.0%, and preferably not more than 20.0%, further preferably not more than 19.0% of the same. Similarly, the width L3 of the inner wall surface 22 at the outer end 22o is preferably set not less than 9.0% of the pattern pitch Q, further preferably not less than 10.0%, and preferably not more than 14.0%, further preferably not more than 13.0%.

In addition, as shown in FIG. 1, a height H1 of the rib 18 at the outmost point 18o from a bead base line BL is preferably 0.5 times or more a tire cross section height H0, further preferably 0.6 times or more. If the height H1 becomes smaller, there is a possibility that the sidewall portions 3 on the radially outer side prone to be cut cannot be sufficiently protected. In contrast, if the height H1 becomes larger, the tread portion 2 may be excessively increased in rubber volume, thereby generating cracks. From this point of view, the height H1 is preferably 0.85 times or less the tire cross section height H0, further preferably 0.80 times or less.

Meanwhile, a height H2 of the rib 18 at the innermost point 18i from the bead base line BL is preferably 0.45 times or more the tire cross section height H0, further preferably 0.5 times or more. If the height H2 is too small, the sidewall portions 3 may be excessively increased in rigidity, which deteriorates riding comfort or generates cracks. In contrast, if the height H2 becomes excessively large, it is not possible to increase the rigidity of the sidewall portions 3 or sufficiently enhance steering stability. From this point of view, the height H2 is preferably 0.75 times or less the tire cross section height H0, further preferably 0.7 times or less.

Next, the low height parts 19 are spaced between the ribs 18 and 18 circumferentially adjacent to each other, and are each formed with a protruding height L4 smaller than that of the ribs 18, as shown in FIGS. 3 and 4. The low height parts 19 are useful for further reducing rubber volume and enhancing cut resistance and steering stability while suppressing excessive increase in tire mass.

When the protruding height L4 becomes large, there is a possibility that the foregoing operation cannot be effectively provided. In contrast, when the protruding height L4 becomes small, there is a possibility that cut resistance and steering stability cannot be sufficiently enhanced. From this point of view, the protruding height L4 is preferably not more than 2.0 mm, further preferably not more than 1.5 mm, and preferably not less than 0.5 mm, further preferably not less than 0.75 mm.

The low height parts 19 of the present embodiment each have a radially outmost point 19o aligned to the outmost point 17o of the protrusion 17, and have a radially innermost point 19i terminated on the radial outside of the innermost point 17i of the protrusion 17. The low height parts 19 can effectively protect the sidewall portions 3 on the radial outside prone to be cut, and effectively suppress increase in tire mass with reduced rubber volume.

If space H3 between the innermost point 19i of the low height part 19 and the innermost point 17i of the protrusion 17 is small, there is a possibility that increase in tire mass cannot be sufficiently suppressed. In contrast, if the space H3 is large, there is a possibility that the rigidity of the sidewall portions 3 cannot be sufficiently enhanced to improve steering stability. From this point of view, the space H3 is preferably 0.2% or more of the tire cross section height H0, further preferably 0.4% or more, and preferably 0.9% or less, further preferably 0.6% or less.

In addition, in the present embodiment, the low height part 19 each have a radial inner edge 26 including a first inner edge 26A in which a radial length L5 of the low height part 19 from the outer circumferential line Go gradually decreases and a second inner edge 26B in which the length L5 gradually increases, and these inner edges are alternately arranged in the circumferential direction of the tire. Accordingly, the inner edges 26 are circumferentially formed in a zigzag arrangement. The low height parts 19 effectively disperse in a radial direction, distortions that are likely to occur intensively at the inner edges 26 due to a difference in rigidity between the low height parts 19 and the normal outer surfaces 16 of the sidewall, thereby suppressing generation of cracks at the inner edges 26.

Further, the first inner edge 26A and the second inner edge 26B are provided with cutout grooves 28 and 28 cut in an approximately triangular shape from zigzag-shaped internal corner portions 27. The cutout grooves 28 and 28 are useful for effectively dispersing distortions most likely to intensively occur at the inner edges 26, thereby suppressing cracks in a reliable manner, and are also useful for suppressing increase in tire mass.

In addition, the low height parts 19 are each provided with a circumferential side groove 31 that extends circumferentially from one rib 18A of the ribs 18 and 18 in a pair circumferentially adjacent to each other and terminates without reaching the other rib 18B; and a pair of radial side grooves 32 and 32 that pass over the circumferential side groove 31 from the outmost point 19o as radial outer edge of the low height part 19 and terminates without reaching the inner edge 26.

The circumferential side grooves 31 each extend so as to incline radially outwardly with respect to the circumferential direction of the tire, and an angle α2 of the circumferential side groove 31 with respect to the circumferential direction is preferably in a range of from 5 to 25 degrees, for example. In addition, the circumferential side grooves 31 are each tapered such that a radial width W2 gradually decreases from the one rib 18 to the other rib 18.

The radial side grooves 32 and 32 in a pair are circumferentially spaced between the ribs 18 and 18 circumferentially adjacent to each other. In addition, the radial side grooves 32 and 32 extend with inclination at an angle α3 of from 10 to 60 degrees with respect to the radial direction of the tire, and are each tapered such that a circumferential width W3 gradually decreases from the outmost point 19o of the low height part 19 toward the inner edge 26.

The circumferential side grooves 31 and the radial side grooves 32 make it possible to locally weaken the rigidity of the low height parts 19, disperse radial and circumferential distortions, and effectively suppress generation of cracks on the surfaces of the low height parts 19.

If the maximum width W2m of the width W2 of the circumferential side grooves 31 becomes small, there is a possibility that distortions of the low height parts 19 cannot be sufficiently dispersed. In contrast, if the maximum width W2m becomes large, there is a possibility that cut resistance and steering stability cannot be sufficiently enhanced. From this point of view, the maximum width W2m is preferably not less than 3 mm, further preferably not less than 4.5 mm, and preferably not more than 10.5 mm, further preferably not more than 9.5 mm.

From the same point of view, a maximum width W3m of the width W3 of the radial side grooves 32 is preferably not less than 5 mm, further preferably not less than 6 mm, and preferably not more than 16 mm, further preferably not more than 15 mm.

In addition, the circumferential side grooves 31 and the radial side grooves 32 desirably have leading end portions chamfered in an arc with a radius of 0.5 mm or more. Accordingly, it is possible to disperse distortions that are likely to intensively occur at the leading end portions of the side grooves 31 and 32, and improve processability of vulcanizing metal molds.

As shown in FIG. 2, the protrusions 17 of the present embodiment are each formed by arranging repeatedly the protrusion design units 20 in the circumferential direction of the tire. In addition, the protrusion design units 20 include a plurality of kinds of units with different pattern pitches Q (Q1, Q2, . . . ) as circumferential lengths Accordingly, the protrusions 17 make it possible to change circumferential lengths, angles, and the like, of the ribs 18 and the low height parts 19 in the circumferential direction, thereby circumferentially dispersing distortions occurring at the components.

In addition, the pattern pitches Q (Q1, Q2, . . . ) of the protrusion design units 20 of the present embodiment are aligned to the pattern pitches P (P1, P2, . . . ) of the tread design units. Further, in the present embodiment, the ribs 18 with high rigidity are disposed on the axial outside of the shoulder lug grooves 12B, and the low height parts 19 with low rigidity are disposed on the axial outside of the shoulder blocks 15C.

Accordingly, the ribs 18 and the low height parts 19 make it possible to moderate uneven rigidity of the sidewall portions 3 resulting from a difference in rigidity between the shoulder blocks 15C and the shoulder lug grooves 12B, thereby further improving steering stability. In addition, the ribs 18 and the low height parts 19 also make it possible to circumferentially align pattern regularities of the tread portion 2 and the protrusions 17, thereby further improving aesthetic properties of the tire.

As shown in FIGS. 1 and 4, circumferential ribs 33 are preferably provided between the shoulder lug grooves 12B and the protrusions 17 so as to rise from the normal outer surfaces 16 of the sidewall and extend continuously in the circumferential direction of the tire. The circumferential ribs 33 make it possible to increase rubber volume of the radially outmost point of the sidewall portions 3 most likely to be cut, continuously in the circumferential direction, thereby effectively improving cut resistance over the entire circumferential area without interruption. Further, in the present embodiment, the circumferential ribs 33 are formed by two each. Accordingly, the tire 1 can be further improved in cut resistance and permitted to flex radially between the circumferential ribs 33 and 33, thereby moderating longitudinal rigidity of the tire.

To effectively achieve the foregoing operation, a rising height L6 of the circumferential ribs 33 is preferably not less than 0.5 mm, further preferably not less than 1.0 mm, and preferably not more than 3.5 mm, further preferably not more than 2.5 mm. Similarly, space W4 between the circumferential ribs 33 and 33 is preferably not less than 0.5 mm, further preferably not less than 1.0 mm, and preferably not more than 2.5 mm, further preferably not more than 2.0 mm.

Next, one embodiment of a method for manufacturing the tire 1 will be described.

Figure 6:
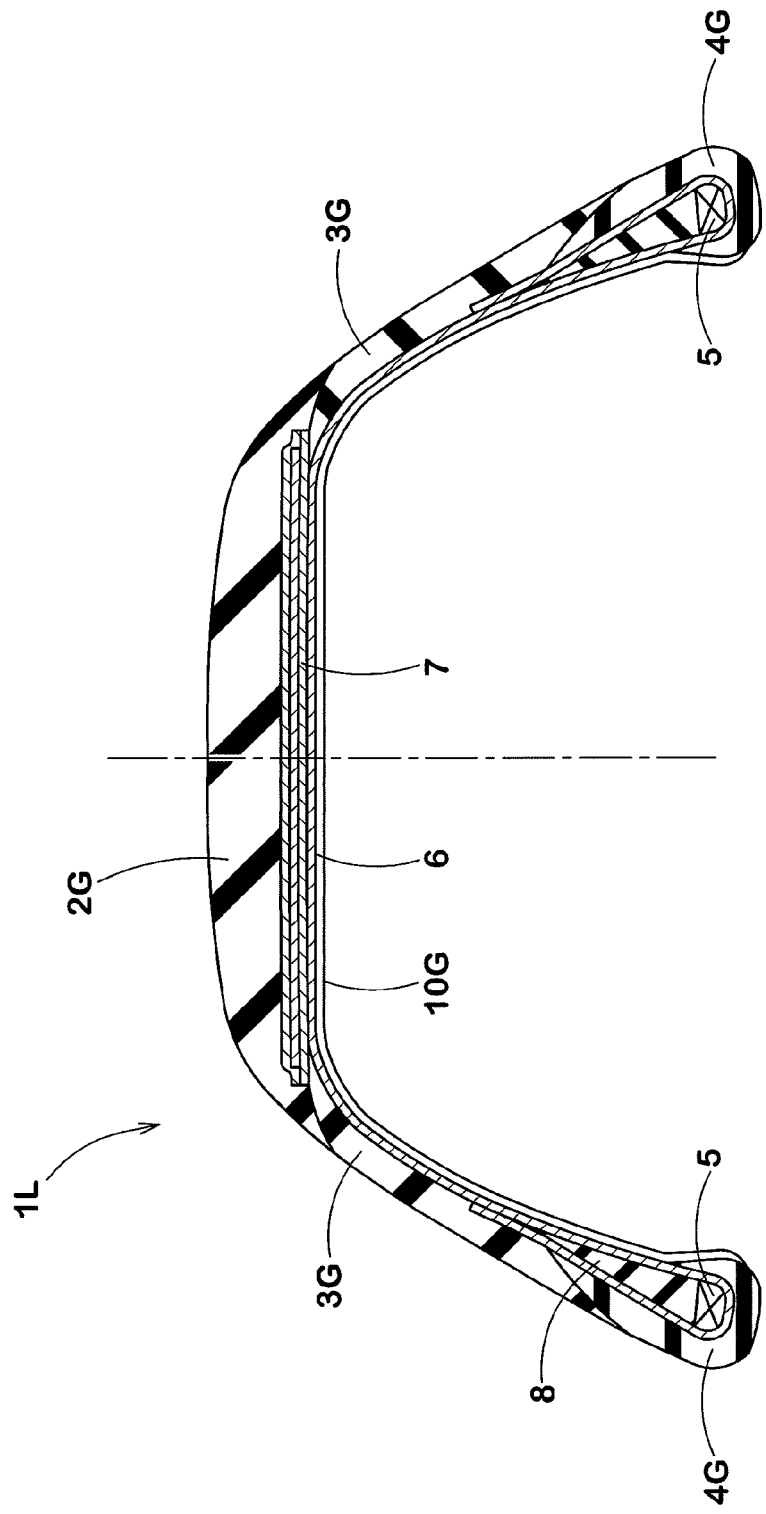
FIG. 6 is a cross sectional view of a raw tire.
Figure 7:
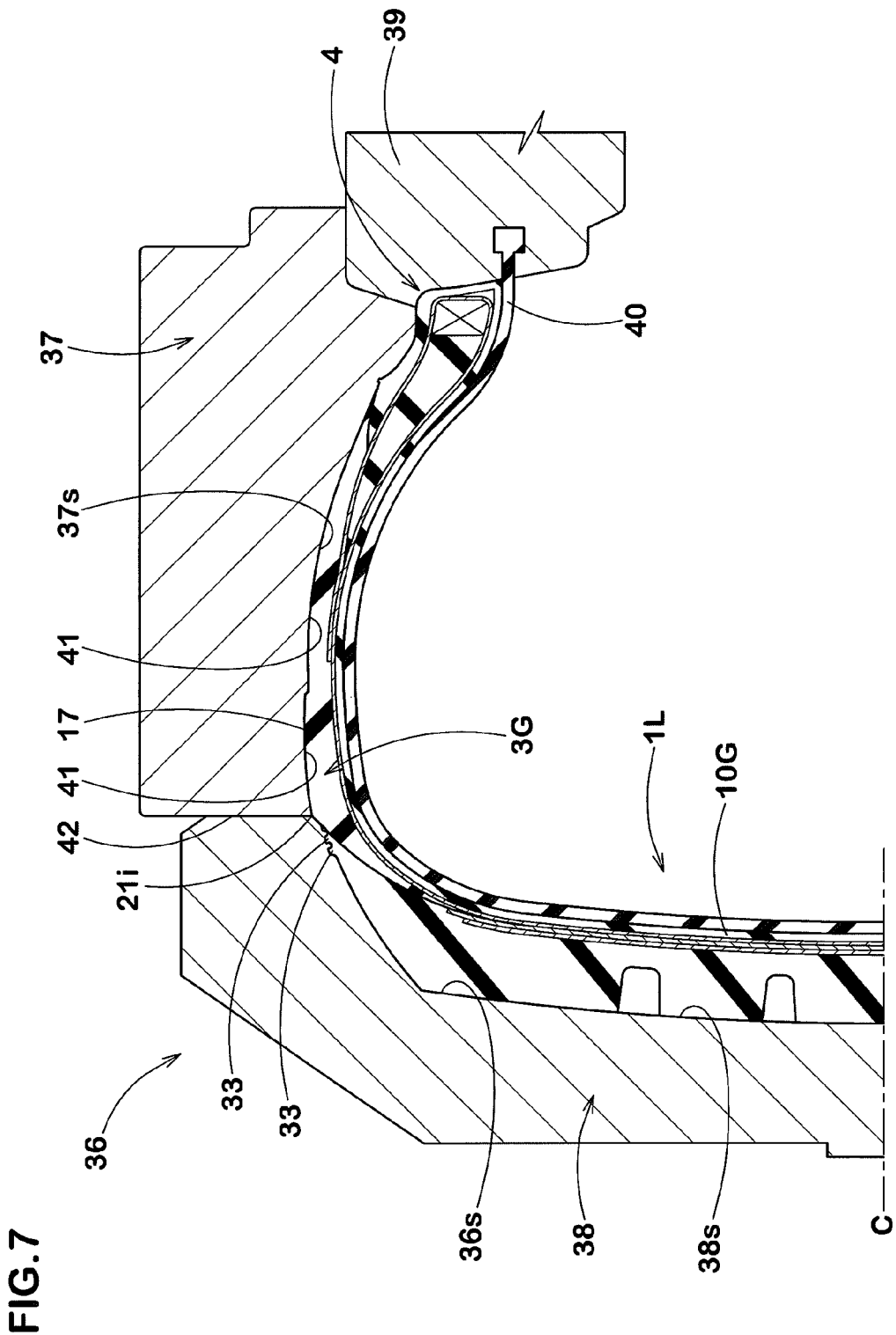
FIG. 7 is a cross sectional view for describing a vulcanization molding process.

The tire 1 of the present embodiment can be manufactured by a method including, first, the steps of molding a raw tire 1L and vulcanizing the same in accordance with customary practice, as shown in FIGS. 6 and 7.

At the step of molding the raw tire, the raw tire (green tire) 1L is formed by adhering tread rubber 2G, sidewall rubber 3G, clinch rubber 4G, and inner liner rubber 10G, to a tire skeleton body including the carcass 6 having the bead core 5 and the belt 7, as shown in FIG. 6. In the state of the raw tire 1L, the protrusions 17 (shown in FIG. 1) are not yet formed.

At the step of vulcanization, the raw tire 1L is vulcanized using a vulcanizing metal mold 36 having a cavity 36s for forming the outer surface of the raw tire 1L, as shown in FIG. 7.

The vulcanizing metal mold 36 of the present embodiment is configured to include a pair of sidewall molds 37 having a sidewall forming surface 37s, a tread mold 38 having a tread rubber forming surface 38s, and a pair of bead rings 39 capable of holding the bead portions 4 of the raw tire 1L.

When the sidewall molds 37, the tread mold 38, and the bead rings 39 are fitted together, the vulcanizing metal mold 36 forms the cavity 36s. The raw tire 1L is placed in the cavity 36s, and then is vulcanized by being pressed against the cavity 36s by expansion of a bladder 40 to which a high-pressure fluid is supplied, in accordance with customary practice.

The sidewall forming surface 37s and the tread rubber forming surface 38s are provided with concaves 41 for formation of the protrusions 17. When the sidewall rubber 3G is pressed against the concaves 41, the protrusions 17 are formed in a reverse pattern of the concaves 41. To suppress molding defects on the protrusions 17, the concaves 41 are preferably provided with vent holes (not shown) for vacuuming the residual air.

In addition, a dividing surface 42 between the sidewall mold 37 and the tread mold 38 is preferably aligned to the inner end 21i of the outer wall surface 21 (shown in FIG. 4) with the largest height L1 of the ribs 18. Accordingly, the sidewall rubber 3G makes it possible to reliably discharge residual air in the concaves 41 and suppress absorption of rubber into the dividing surface 42, thereby suppressing generation of molding defects such as burrs or bare spots on the ribs 18 and the like.

In addition, the circumferential ribs 33 of the present embodiment are provided by two each, which makes it possible for the sidewall rubber 3G to smoothly flow by vacuuming residual air from the vent holes (not shown). This allows effective suppression of occurrence of molding defects such as bare spots on the protrusions 17 and the circumferential ribs 33.

As in the foregoing, the particularly preferred embodiment of the present invention is described. However, the present invention is not limited to the illustrated embodiment, and can be modified and carried out in various embodiments.

Comparison Test:

Tires of the basic structure shown in FIG. 1 with protrusions shown in Table 1 were manufactured and evaluated for performance. Common specifications are as follows:

Tire size: LT315/75R16
Rim size: 16×8.0J
Tire section height H0: 235.85 mm
Circumferential width L2 of outer wall surface: 4.8 to 6.4 mm
Circumferential width L3 of inner wall surface: 2.9 to 3.9 mm
Circumferential Side Groove:
Angle α2: 8 to 14 degrees
Maximum width W2m: 3.5 mm
Radial Side Groove:
Angle α3: 12 to 32 degrees
Maximum width W3m: 3.0 to 5.0 mm
Circumferential Rib:
Protruding height L6 (mm): 1.5 mm
Space W4 (mm): 3 mm Test procedures are as follows:

Steering Stability:

The sample tires were mounted on the wheel rims described above, inflated with an air pressure of 275 kPa, and attached to each wheel of a four-wheel-drive vehicle of 4,300 cc displacement. In addition, one driver drove the vehicle in a test course on a dry asphalt road, and evaluated the tires by his/her sensuality for steering responsibility at cornering, rigid impression, grip characteristics, and the like. Test results are shown with a score of 100 representing values in example 1. Larger values are more favored.

Cut Resistance:

The sample tires were mounted on the rims described above, and inflated with the foregoing air pressure. Then, a pendulum having a weight with a wedge-shaped blade was freely fallen onto the sidewall portions of the tires to wield impact on the sidewall portions, and energy of breaking the sidewall portions was determined from the mass of the weight and the height at which the weight was fallen. Determination results are shown with an index of 100 representing energy in example 1. Larger values are more favored.

Crack Resistance:

The sample tires were mounted on the rims described above under the above conditions and attached to the foregoing vehicle. Then, after driving in a test course on a dry asphalt road, maximum values of surface distortions on the sidewall portions were measured. Measurement results are shown as inverse numbers of the surface distortions with an index of 100 representing a value in example 1. Larger values are more favored.

Aesthetic Properties:

Two drivers evaluated, on the basis of their feelings, pattern regularities of the tread portions, the protrusions of the sample tires, and high-quality mood of the sample tires as a whole. Evaluation results are shown with a score of 100 representing a value in example 1. Larger values are more favored.

Tire Mass:

Each of the sample tires was measured in mass. Measurement results are shown as inverse numbers of mass with an index of 100 representing a value in example 1. Larger values are more favored.

Table 1 shows test results.

TABLE 1

|  | Comparative example 1 | Comparative example 2 | Comparative example 3 | Comparative example 4 | Comparative example 5 |
| --- | --- | --- | --- | --- | --- |
| Drawing showing protrusions | FIG. 8 | FIG. 3 | FIG. 3 | FIG. 3 | FIG. 3 |
| Maximum height L1 of rib (mm) | 3.0 | 0.2 | 8.0 | 3.0 | 3.0 |
| Protrusion total area A1 (mm$^2$) | 179251 | 122490 | 122490 | 80663 | 152363 |
| Area A2 of region between outer circumferential line and middle circumferential line (mm$^2$) | 179251 | 179251 | 179251 | 179251 | 179251 |
| Ratio (A1/A2) (%) | 100 | 68 | 68 | 45 | 85 |
| Area A2o of region between outer circumferential line and middle circumferential line (mm$^2$) | 92042 | 92042 | 92042 | 92042 | 92042 |
| Total area A1o of protrusions in outer sidewall region (mm$^2$) | 92042 | 70616 | 70616 | 46626 | 88071 |
| Ratio (A1o/A2o) (%) | 100 | 77 | 77 | 51 | 96 |
| Area A2i of region between inner circumferential line and middle circumferential line (mm$^2$) | 87209 | 87209 | 87209 | 87209 | 87209 |
| Total area A1i of protrusions in inner sidewall region (mm$^2$) | 87209 | 51874 | 51874 | 34037 | 64292 |
| Ratio (A1i/A2i) (%) | 100 | 60 | 60 | 39 | 74 |
| Ratio (A1o/A2o)/ratio (A1i/A2i) (%) | 100 | 128 | 128 | 131 | 130 |
| Angle α1 of rib (degree) | — | 10 | 10 | 10 | 10 |
| Height H1 of outmost point of rib (mm) | 182 | 182 | 182 | 182 | 182 |
| Height H2 of innermost point of rib (mm) | 144 | 144 | 144 | 144 | 144 |
| Ratio (H1/H0) (times) | 0.77 | 0.77 | 0.77 | 0.77 | 0.77 |
| Ratio (H2/H0) (times) | 0.61 | 0.61 | 0.61 | 0.61 | 0.61 |
| Protruding height L4 of low height part 19 (mm) | — | 1.0 | 1.0 | 1.0 | 1.0 |
| Space H3 between innermost point of low height part and innermost point of protrusion (mm) | — | 1.1 | 1.1 | 1.1 | 1.1 |
| Ratio (H3/H0) (%) | — | 0.47 | 0.47 | 0.47 | 0.47 |
| Presence or absence of match in pattern pitch between protrusion design units and tread design units | Absence | Presence | Presence | Presence | Presence |
| Steering stability (index) [larger is better] | 100 | 90 | 105 | 95 | 105 |
| Cut resistance (index) [larger is better] | 105 | 80 | 110 | 90 | 105 |

TABLE 1-continued

| | | | | | |
|---|---|---|---|---|---|
| Crack resistance (index) [larger is better] | 100 | 110 | 75 | 100 | 100 |
| Aesthetic properties (index) [larger is better] | 80 | 95 | 105 | 90 | 90 |
| Tire mass (index) [larger is better] | 80 | 110 | 80 | 105 | 85 |

| | Example 1 | Comparative example 6 | Example 2 | Example 3 | Example 4 |
|---|---|---|---|---|---|
| Drawing showing protrusions | FIG. 3 | FIG. 3 | FIG. 3 | FIG. 3 | FIG. 3 |
| Maximum height L1 of rib (mm) | 3.0 | 3.0 | 3.0 | 5.0 | 0.5 |
| Protrusion total area A1 (mm$^2$) | 122490 | 122490 | 122490 | 122490 | 122490 |
| Area A2 of region between outer circumferential line and middle circumferential line (mm$^2$) | 179251 | 179251 | 179251 | 179251 | 179251 |
| Ratio (A1/A2) (%) | 68 | 68 | 68 | 68 | 68 |
| Area A2o of region between outer circumferential line and middle circumferential line (mm$^2$) | 92042 | 92042 | 92042 | 92042 | 92042 |
| Total area A1o of protrusions in outer sidewall region (mm$^2$) | 70616 | 70616 | 70616 | 70616 | 70616 |
| Ratio (A1o/A2o) (%) | 77 | 77 | 77 | 77 | 77 |
| Area A2i of region between inner circumferential line and middle circumferential line (mm$^2$) | 87209 | 87209 | 87209 | 87209 | 87209 |
| Total area A1i of protrusions in inner sidewall region (mm$^2$) | 51874 | 51874 | 51874 | 51874 | 51874 |
| Ratio (A1i/A2i) (%) | 60 | 60 | 60 | 60 | 60 |
| Ratio (A1o/A2o)/ratio (A1i/A2i) (%) | 128 | 128 | 128 | 128 | 128 |
| Angle α1 of rib (degree) | 0 | 25 | 10 | 10 | 10 |
| Height H1 of outmost point of rib (mm) | 182 | 182 | 182 | 182 | 182 |
| Height H2 of innermost point of rib (mm) | 144 | 144 | 144 | 144 | 144 |
| Ratio (H1/H0) (times) | 0.77 | 0.77 | 0.77 | 0.77 | 0.77 |
| Ratio (H2/H0) (times) | 0.61 | 0.61 | 0.61 | 0.61 | 0.61 |
| Protruding height L4 of low height part 19 (mm) | 1.0 | 1.0 | 1.0 | 1.0 | 1.0 |
| Space H3 between innermost point of low height part and innermost point of protrusion (mm) | 1.1 | 1.1 | 1.1 | 1.1 | 1.1 |
| Ratio (H3/H0) (%) | 0.47 | 0.47 | 0.47 | 0.47 | 0.47 |
| Presence or absence of match in pattern pitch between protrusion design units and tread design units | Presence | Presence | Presence | Presence | Presence |
| Steering stability (index) [larger is better] | 100 | 100 | 100 | 105 | 95 |
| Cut resistance (index) [larger is better] | 95 | 90 | 100 | 110 | 90 |
| Crack resistance (index) [larger is better] | 100 | 95 | 100 | 90 | 110 |
| Aesthetic properties (index) [larger is better] | 100 | 100 | 100 | 105 | 95 |
| Tire mass (index) [larger is better] | 100 | 100 | 100 | 90 | 105 |

| | Example 5 | Example 6 | Example 7 | Example 8 | Example 9 |
|---|---|---|---|---|---|
| Drawing showing protrusions | FIG. 3 | FIG. 3 | FIG. 3 | FIG. 3 | FIG. 3 |
| Maximum height L1 of rib (mm) | 3.0 | 3.0 | 3.0 | 3.0 | 3.0 |
| Protrusion total area A1 (mm$^2$) | 89626 | 122490 | 122490 | 122490 | 122490 |
| Area A2 of region between outer circumferential line and middle circumferential line (mm$^2$) | 179251 | 179251 | 179251 | 179251 | 179251 |
| Ratio (A1/A2) (%) | 50 | 68 | 68 | 68 | 68 |
| Area A2o of region between outer circumferential line and middle circumferential line (mm$^2$) | 92042 | 92042 | 92042 | 92042 | 92042 |
| Total area A1o of protrusions in outer sidewall region (mm$^2$) | 51807 | 64429 | 73634 | 70616 | 70616 |
| Ratio (A1o/A2o) (%) | 56 | 70 | 80 | 77 | 77 |
| Area A2i of region between inner circumferential line and middle circumferential line (mm$^2$) | 87209 | 87209 | 87209 | 87209 | 87209 |
| Total area A1i of protrusions in inner sidewall region (mm$^2$) | 37819 | 54942 | 49709 | 51874 | 51874 |
| Ratio (A1i/A2i) (%) | 43 | 63 | 57 | 60 | 60 |
| Ratio (A1o/A2o)/ratio (A1i/A2i) (%) | 130 | 111 | 140 | 128 | 128 |
| Angle α1 of rib (degree) | 10 | 10 | 10 | 10 | 10 |
| Height H1 of outmost point of rib (mm) | 182 | 182 | 182 | 207 | 182 |
| Height H2 of innermost point of rib (mm) | 144 | 144 | 144 | 144 | 106 |
| Ratio (H1/H0) (times) | 0.77 | 0.77 | 0.77 | 0.88 | 0.77 |
| Ratio (H2/H0) (times) | 0.61 | 0.61 | 0.61 | 0.61 | 0.45 |
| Protruding height L4 of low height part 19 (mm) | 1.0 | 1.0 | 1.0 | 1.0 | 1.0 |
| Space H3 between innermost point of low height part and innermost point of protrusion (mm) | 1.1 | 1.1 | 1.1 | 1.1 | 1.1 |
| Ratio (H3/H0) (%) | 0.47 | 0.47 | 0.47 | 0.47 | 0.47 |
| Presence or absence of match in pattern pitch between protrusion design units and tread design units | Presence | Presence | Presence | Presence | Presence |
| Steering stability (index) [larger is better] | 95 | 100 | 97 | 100 | 100 |
| Cut resistance (index) [larger is better] | 95 | 95 | 100 | 105 | 105 |
| Crack resistance (index) [larger is better] | 100 | 100 | 98 | 90 | 80 |
| Aesthetic properties (index) [larger is better] | 95 | 100 | 100 | 100 | 100 |
| Tire mass (index) [larger is better] | 110 | 100 | 100 | 90 | 80 |

TABLE 1-continued

|  | Example 10 | Example 11 | Example 12 | Example 13 | Example 14 |
|---|---|---|---|---|---|
| Drawing showing protrusions | FIG. 3 | FIG. 3 | FIG. 3 | FIG. 3 | FIG. 3 |
| Maximum height L1 of rib (mm) | 3.0 | 3.0 | 3.0 | 3.0 | 3.0 |
| Protrusion total area A1 (mm$^2$) | 122490 | 122490 | 122490 | 122490 | 122490 |
| Area A2 of region between outer circumferential line and middle circumferential line (mm$^2$) | 179251 | 179251 | 179251 | 179251 | 179251 |
| Ratio (A1/A2) (%) | 68 | 68 | 68 | 68 | 68 |
| Area A2o of region between outer circumferential line and middle circumferential line (mm$^2$) | 92042 | 92042 | 92042 | 92042 | 92042 |
| Total area A1o of protrusions in outer sidewall region (mm$^2$) | 70616 | 70616 | 70616 | 70616 | 70616 |
| Ratio (A1o/A2o) (%) | 77 | 77 | 77 | 77 | 77 |
| Area A2i of region between inner circumferential line and middle circumferential line (mm$^2$) | 87209 | 87209 | 87209 | 87209 | 87209 |
| Total area A1i of protrusions in inner sidewall region (mm$^2$) | 51874 | 51874 | 51874 | 51874 | 51874 |
| Ratio (A1i/A2i) (%) | 60 | 60 | 60 | 60 | 60 |
| Ratio (A1o/A2o)/ratio (A1i/A2i) (%) | 128 | 128 | 128 | 128 | 128 |
| Angle α1 of rib (degree) | 10 | 10 | 10 | 10 | 10 |
| Height H1 of outmost point of rib (mm) | 182 | 182 | 182 | 182 | 182 |
| Height H2 of innermost point of rib (mm) | 144 | 144 | 144 | 144 | 144 |
| Ratio (H1/H0) (times) | 0.77 | 0.77 | 0.77 | 0.77 | 0.77 |
| Ratio (H2/H0) (times) | 0.61 | 0.61 | 0.61 | 0.61 | 0.61 |
| Protruding height L4 of low height part 19 (mm) | 0.5 | 2.0 | 1.0 | 1.0 | 1.0 |
| Space H3 between innermost point of low height part and innermost point of protrusion (mm) | 1.1 | 1.1 | 0.5 | 2.1 | 1.1 |
| Ratio (H3/H0) (%) | 0.47 | 0.47 | 0.2 | 0.9 | 0.47 |
| Presence or absence of match in pattern pitch between protrusion design units and tread design units | Presence | Presence | Presence | Presence | Absence |
| Steering stability (index) [larger is better] | 95 | 120 | 100 | 95 | 100 |
| Cut resistance (index) [larger is better] | 85 | 115 | 100 | 100 | 100 |
| Crack resistance (index) [larger is better] | 105 | 80 | 100 | 100 | 100 |
| Aesthetic properties (index) [larger is better] | 100 | 100 | 100 | 100 | 95 |
| Tire mass (index) [larger is better] | 110 | 80 | 95 | 105 | 100 |

As a result of the testing, it has been confirmed that the tire of the example makes it possible to suppress increase in tire mass while maintaining cut resistance and steering stability.

What is claimed is:

1. A pneumatic tire comprising
a tread portion,
a pair of sidewall portions each extending radially inwardly from an edge of the tread portion,
a pair of bead portions each being formed on radially inner portion of the sidewall portion,
a protrusion being formed on at least one sidewall portion and protruding from a normal outer surface of the sidewall portion, wherein
the protrusion comprises
a plurality of longitudinal ribs each extending at angle of from 0 to 20 degrees with respect to a radial direction of the tire and
a low height part disposed between the longitudinal ribs,
each longitudinal rib has a protruding height of 0.5 to 7.0 mm from the normal outer surface of the sidewall portion, wherein the longitudinal rib comprises an outer wall surface extending radially inwardly from a radially outmost point of the rib while gradually increasing its protruding height,
each low height part has a protruding height from the normal outer surface of the sidewall which is lower than a maximum protruding height of the longitudinal ribs, wherein the low height part comprises a radially outer portion protruding beyond the outer wall surface of the longitudinal rib in a cross section view of the tire, and
the sidewall portion with the protrusion has a ratio A1/A2 between a total area A1 of the protrusion projected onto the normal outer surface of the sidewall portion and an area A2 between an outer circumferential line on the sidewall portion passing a radially outmost point of the protrusion and an inner circumferential line on the sidewall portion passing a radially innermost point of the protrusion is in a range of from 50 to 80%.

2. The pneumatic tire according to claim 1, wherein
the radially outmost point of the longitudinal rib is located in a range of from 0.5 to 0.85 times a tire section height from a bead base line, and
the radially innermost point of the longitudinal rib is located in a range of from 0.45 to 0.75 times the tire section height from the bead base line.

3. The pneumatic tire according to claim 2, wherein
in the sidewall portion with the protrusion, a ratio A1o/A2o is larger than a ratio A1i/A2i:
here, A2o is an area between the outer circumferential line and a middle circumferential line which passes through the center point between the outer circumferential line and the inner circumferential line;
A1o is an area of the protrusion formed in the area A2o;
A2i is an area between the inner circumferential line and the middle circumferential line; and
A1i is an area of the protrusion formed in the area A2i.

4. The pneumatic tire according to claim 1, wherein
in the sidewall portion with the protrusion, a ratio A1o/A2o is larger than a ratio A1i/A2i:
here, A2o is an area between the outer circumferential line and a middle circumferential line which passes the center point between the outer circumferential line and the inner circumferential line;
A1o is an area of the protrusion formed in the area A2o;
A2i is an area between the inner circumferential line and the middle circumferential line; and
A1i is an area of the protrusion formed in the area A2i.

5. The pneumatic tire according to claim 1, wherein
the protrusion comprises a plurality of protrusion design units arranged repeatedly in the circumferential direction of the tire, and the protrusion design units have a plurality of kinds with different pattern pitch of circumferential length of the tire.

6. The pneumatic tire according to claim 5, wherein
a tread pattern of the tread portion is formed by tread design units arranged repeatedly in circumferential direction of the tire,
the tread design units have a plurality of kinds with different pattern pitch of circumferential length of the tire, and
each pattern pitch of the tread design units corresponds to each pattern pitch of the protrusion design units.

7. The pneumatic tire according to claim 1, wherein
the tread portion is provided with a shoulder lug groove,
the shoulder lug groove extends from the tread portion beyond one of the tread edges and terminates without reaching the protrusion,
a circumferentially extending rib is provided between the shoulder lug groove and the protrusion, and
the circumferentially extending rib protrudes from the normal outer surface of the sidewall portion.

8. The pneumatic tire according to claim 1, wherein the outer wall surface of the longitudinal rib has a circumferential width which gradually decreases radially inwardly.

* * * * *